United States Patent Office 3,141,021
Patented July 14, 1964

3,141,021
N-ARYLALKYL AND N-ARYLALKENYL DERIVATIVES OF 4-ALKOXY-4-PHENYLPIPERIDINES
Paul A. J. Janssen, Vosselaar, near Turnhout, Belgium, assignor to Research Laboratorium Dr. C. Janssen, N.V., Beerse, Belgium, a company of Belgium
No Drawing. Filed Mar. 22, 1961, Ser. No. 97,428
11 Claims. (Cl. 260—294.7)

The present invention relates to a novel group of N-substituted 4-alkoxy-4-arylpiperidines. The nitrogen substituent is an arylalkyl or an arylalkenyl group. More particularly, the compounds of this invention can be represented by the following general formula

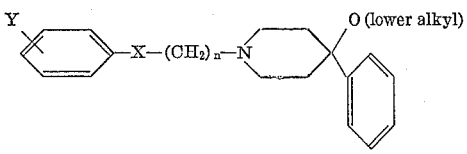

wherein Y is selected from the group consisting of hydrogen, methyl, methoxy, and fluorine; X is selected from the group consisting of —$CH_2$— and —CH=CH—; $n$ is a positive integer less than 4; and lower alkyl includes methyl, ethyl, propyl, and butyl.

The compounds of this invention are active inhibitors of pentylenetetrazole-induced convulsions. In contrast, the corresponding alcohols, which are 4-substituted 4-hydroxy-4-phenylpiperidines, are inactive against pentylenetetrazole convulsions. In addition, the present compounds antagonize electroshock seizures.

The organic bases of this invention form nontoxic, acid addition salts with a variety of organic and inorganic acids. Such salts are formed with such acids as sulfuric, phosphoric, hydrochloric, hydrobromic, hydriodic, sulfamic, citric, lactic, maleic, malic succinic tartaric cinnamic, acetic, benzoic, gluconic, ascorbic and related acids. They also form quaternary ammonium salts with a variety of organic esters of sulfuric hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

To prepare the compounds of this invention, the appropriate alkyl halide is heated with a 4-alkoxy-4-phenylpiperidine in 4-methyl-2-pentanone in the presence of sodium carbonate and a trace of potassium iodide. Several alternate procedures are also available for the preparation of these compounds. For example, the saturated compounds can be prepared by the catalytic hydrogenation of the unsaturated compounds of this invention such as 1-cinnamyl-4-methoxy-4-phenylpiperidine.

An alternate method for the preparation of the arylalkenyl compounds makes use of a ketone of the following type:

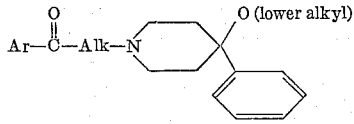

This ketone can be obtained by condensing the appropriate substituted piperidine with a compound of the formula Ar-CO-Alk-Halogen or, in the case where Alk is ethylene, by mixing the piperidine with an acetophenone and formaldehyde. Reduction of the ketone described above with sodium borohydride gives the corresponding alcohol which loses water to give the corresponding unsaturated compound.

The 4-alkoxy-4-phenylpiperidines described above as intermediates can be prepared in the following manner. 4-phenylpiperidin-4-ol is heated with p-toluenesulfonyl chloride to give 1-(4-tosyl)-4-phenylpiperidin-4-ol which is heated with sodamide in toluene to give the alkoxide. Further heating of the alkoxide with an appropriate alkyl halide gives the corresponding 1-(4-tosyl)-4-alkoxy-4-phenylpiperidine having the formula

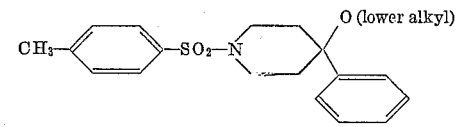

This compound is heated with sodium in butanol under a nitrogen atmosphere to give the desired 4-alkoxy-4-phenylpiperidine.

The compounds which constitute this invention and their preparation will appear more fully from a consideration of the following examples which are given for the purpose of illustration only are not to be construed as limiting the invention in spirit or in scope. In these examples, quantities are indicated as parts by weight, temperatures in degrees centigrade (° C.) and pressures in millimeters of mercury (mm.).

Example 1

To a mixture of 83 parts of β-(4-fluorophenyl)ethyl alcohol and 320 parts of toluene is added 190 parts of thionyl chloride with cooling. The mixture is refluxed for 5 hours after the addition is complete. Excess thionyl chloride is removed from the reaction mixture under reduced pressure and the residue is distilled to give 2-(4-fluorophenyl)-1-chloroethane boiling at about 98–99° C. at 26 mm. pressure.

Example 2

A mixture of 856 parts of ammonium chloride and 3000 parts of 36% formaldehyde is stirred and heated at about 60° C. While cooling to maintain this temperature, 944 parts of α-methylstyrene is added slowly. After the addition is completed, the mixture is stirred at room temperature until the temperature of the mixture drops to about 40° C. After 2000 parts of methanol is added, the stirring is continued for 20 hours. The methanol is removed under reduced pressure and the residue is diluted with 2500 parts of concentrated hydrochloric acid. The mixture is heated for 4 hours with stirring at a temperature of 100° C. The mixture is then cooled, diluted with 2000 parts of water, made alkaline with sodium hydroxide and extracted with benzene. The extract is dried, filtered, and the filtrate is distilled. The residue is distilled under vacuum to yield 4-phenyl-1,2,3,6-tetrahydropyridine which boils at about 97–112° C. at 1 mm. pressure. The hydrochloride of the compound is prepared by passing dry hydrogen chloride gas through a benzene solution of the base. The hydrochloride melts at about 199–202° C.

While the temperature is maintained at about 10–20° C., anhydrous hydrogen bromide gas is passed for 7 hours through a solution of 160 parts of 4-phenyl-1,2,3,6-tetrahydropyridine in 500 parts of acetic acid. The mixture is stirred during the addition of the hydrogen bromide gas. After allowing the mixture to stand for 16 hours, the acetic acid and excess hydrogen bromide are removed under vacuum at a bath temperature of less than 40° C. The residue is suspended in ether. From this suspension the precipitate is collected on a filter. It is then recrystallized from a mixture of acetone and 2-propanol to yield 4-phenyl-4-bromopiperidine hydrobromide melting at about 209.5–210.5° C.

A solution of 160 parts of this hydrobromide in 3000 parts of water is treated with 100 parts of 20% sodium hydroxide solution. The resultant precipitate is recovered by filtration, washed with water and then dissolved in 1500 parts of boiling toluene. The solution is dried and then chilled at 0° C. to yield 4-phenylpiperidin-4-ol melting at about 159–160° C.

Example 3

To a mixture of 35 parts of 4-phenylpiperidin-4-ol and 63.5 parts of sodium carbonate in 480 parts of 4-methyl-2-pentanone is added portionwise a solution of 52 parts of p-toluenesulfonyl chloride in 120 parts of 4-methyl-2-pentanone with stirring and gentle heating. After the addition is complete, refluxing and stirring are continued for about 16 hours. The reaction mixture is cooled and 200 parts of water is added. The water layer is separated and extracted with 100 parts of chloroform. The organic layers are combined, dried over potassium carbonate and concentrated to a volume of about 150 parts. The solid which precipitates is filtered, washed and dried to yield 1-(4-tosyl)-4-phenylpiperidin-4-ol melting at about 183–184° C.

Example 4

To a suspension of 9.8 parts of sodamide in 280 parts of toluene is added 69 parts of 1-(4-tosyl)-4-phenylpiperidin-4-ol. The mixture is stirred and refluxed until evolution of ammonia ceases. After cooling 45 parts of methyl iodide is added and the mixture is stirred and refluxed for 5 hours before it is cooled and 150 parts of water is added. A small amount of insoluble material is removed by filtration. The organic layer is separated, dried over magnesium sulfate, filtered and cooled to 0° C. to give 1-(4-tosyl)-4-methoxy-4-phenylpiperidine melting at about 129–130.2° C.

Example 5

To a suspension of 8.3 parts of sodamide in 256 parts of toluene is added 58 parts of 1-(4-tosyl)-4-phenylpiperidin-4-ol. The mixture is stirred and refluxed for 1 hour until no more ammonia gas is evolved. After cooling to room temperature, 52 parts of ethyl iodide is added and the mixture is stirred and refluxed for 16 hours. The reaction mixture is again cooled and 150 parts of water is added. The precipitate is filtered and the toluene layer is separated from the filtrate. The organic layer is dried over magnesium sulfate, filtered and evaporated. The residue is recrystallized from diisopropyl ether to give 1-(4-tosyl)-4-ethoxy-4-phenylpiperidine melting at about 124.4–125.2° C.

Example 6

Under a nitrogen atmosphere, 58 parts of 1-(4-tosyl)-4-phenylpiperidin-4-ol is added to a suspension of 8.3 parts of sodamide in 256 parts of toluene. The mixture is stirred and refluxed for 1 hour until ammonia evolution ceases. After cooling the reaction mixture to room temperature, 48.8 parts of 1-bromopropane is added and the mixture is refluxed and stirred for about 21 hours. The reaction mixture is again cooled before 250 parts of water is added. Filtration removes the unreacted starting material and the organic layer is separated and dried over magnesium sulfate and evaporated. Recrystallization of the residue from diisopropyl ether yields 1-(4-tosyl)-4-propoxy-4-phenylpiperidine melting at about 125.5–127° C.

Substitution of an equivalent quantity of 1-bromobutane for 1-bromopropane in the above example gives 1-(4-tosyl)-4-butoxy-4-phenylpiperidine melting at about 141–143° C.

Example 7

A solution of 46.5 parts of 1-(4-tosyl)-4-methoxy-4-phenylpiperidine in 1080 parts of 1-butanol is heated to reflux under a nitrogen atmosphere. Then 93 parts of sodium is added portionwise over a period of 1 hour. After this addition is complete, the mixture is refluxed for 1.5 hours until all of the sodium is dissolved. It is then cooled to room temperature and decomposed by the dropwise addition of 400 parts of water. The layers are separated and the aqueous layer is extracted with toluene. The organic extract is added to the first butanol solution and the combined solution is washed three times with 100 parts of water. After evaporation of the solvent the oily residue is dissolved in 400 parts of diisopropyl ether and hydrogen chloride gas is introduced into the solution. The precipitated hydrochloride is filtered off, washed with ether and dried to give 4-methoxy-4-phenylpiperidine hydrochloride melting at about 212–215° C.

Substitution of an equivalent quantity of 1-(4-tosyl)-4-ethoxy-4-phenylpiperidine for the 1-(4-tosyl)-4-methoxy-4-phenylpiperidine in the above example yields 4-ethoxy-4-phenylpiperidine hydrochloride melting at about 170–171° C.

If an equivalent quantity of 1-(4-tosyl)-4-propoxy-4-phenylpiperidine is substituted for the 1-(4-tosyl)-4-methoxy-4-phenylpiperidine of the above example there is obtained 4-propoxy-4-phenylpiperidine hydrochloride melting at about 174–175.2° C.

By substitution of an equivalent quantity of 1-(4-tosyl)-4-butoxy-4-phenylpiperidine for the 1-(4-tosyl)-4-methoxy-4-phenylpiperidine of the above example there is obtained 4-butoxy-4-phenylpiperidine hydrochloride melting at about 117–119.4° C.

To obtain the oxalate of 4-methoxy-4-phenylpiperidine a slight modification of the above procedure is used. In this instance the residue remaining after the evaporation of the solvent from the butanol solution is dissolved in a mixture of benzene and water. The benzene layer is separated, dried, filtered and evaporated. The residue is dissolved in 180 parts of 2-propanol and boiled for 5 minutes with a solution of 17.1 parts of oxalic acid dihydrate in 120 parts of 2-propanol. After filtration and cooling this yields 4-methoxy-4-phenylpiperidine oxalate melting at about 160.1–160.4° C.

Example 8

To a stirred mixture of 4.5 parts of 4-methoxy-4-phenylpiperidine isolated from its hydrochloride by evaporation of the solvent from the benzene extracts of an alkalized aqueous solution of the corresponding salt, 7.3 parts of sodium carbonate and a few crystals of potassium iodide in 80 parts of 4-methyl-2-pentanone is added portionwise a solution of 4.5 parts of (2-chloro-ethyl)benzene in 24 parts of 4-methyl-2-pentanone. The reaction mixture is refluxed for 20 hours. The cooled reaction mixture is filtered to remove inorganic salts and the solvent is evaporated from the filtrate. The residue is dissolved in 160 parts of diisopropyl ether and dry hydrogen chloride gas is introduced into the solution. The solid which precipitates is recrystallized from 80 parts of 2-propanol to give 1-(β-phenylethyl)-4-methoxy-4-phenylpiperidine hydrochloride melting at about 245–246° C.

Example 9

A mixture of 8.4 parts of (2-chloroethyl)benzene, 6 parts of 4-ethoxy-4-phenylpiperidine which has been isolated from its hydrochloride, 6.5 parts of sodium carbonate and a few crystals of potassium iodide in 200 parts of 4-methyl-2-pentanone is stirred and refluxed for 48 hours. The cooled reaction mixture is filtered and the solvent is evaporated. The residue is dissolved in diisopropyl ether and hydrogen chloride gas is introduced into the solution. The precipitated hydrochloride is filtered off and recrystallized from a mixture of acetone and 2-propanol to give 1-(β-phenylethyl)-4-ethoxy-4-phenylpiperidine hydrochloride melting at about 255–256° C.

Example 10

Substitution of an equivalent quantity of 4-(2-chloroethyl)toluene for the (2-chloroethyl)benzene in Example 8 gives 1-[β-(4-tolyl)ethyl]-4-methoxy-4-phenylpiperidine hydrochloride melting at about 265–265.6° C.

Example 11

If the procedure of Example 8 is repeated but an equivalent quantity of 4-(2-chloroethyl)anisole is substituted for the (2-chloroethyl)benzene, the product is 1-[β-(4-methoxyphenyl)ethyl]-4-methoxy-4-phenylpiperidine hydrochloride melting at about 259–260.5° C.

By substituting the appropriate starting material in the above procedure, the following compounds are obtained:

1 - [β - (3-methoxyphenyl)ethyl]-4-methoxy-4-phenylpiperidine hydrochloride.

1 - [β - (2 - tolyl)ethyl]-4-methoxy-4-phenylpiperidine hydrochloride.

Example 12

Substitution of an equivalent quantity of 4-(2-chloroethyl)fluorobenzene for the (2-chloroethyl)benzene in Example 8 yields 1-[β-(4-fluorophenyl)ethyl]-4-methoxy-4-phenylpiperidine hydrochloride melting at about 254–255.3° C.

Example 13

To a stirred mixture of 4.5 parts of 4-methoxy-4-phenylpiperidine isolated from its hydrochloride by the procedure of Example 8, 7.3 parts of sodium carbonate, and a few crystals of potassium iodide in 80 parts of 4-methyl-2-pentanone is added portionwise a solution of 6.5 parts of (3-bromopropyl)benzene in 24 parts of 4-methyl-2-pentanone. After the addition is complete, the reaction mixture is refluxed for 20 hours. The cooled reaction mixture is filtered from inorganic salts and the solvent is evaporated from the filtrate. The semisolid residue is extracted with 160 parts of diisopropyl ether and filtered. Dry hydrogen chloride gas is passed through the filtrate and the precipitated solid is recrystallized from 2-propanol to give 1-(γ-phenylpropyl) - 4 - methoxy-4-phenylpiperidine hydrochloride melting at about 205.5–206.5° C. The free base of this compound has the formula

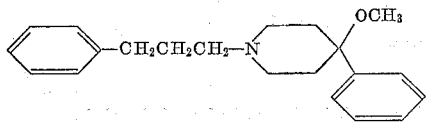

Example 14

A mixture of 6 parts of (3-bromopropyl)benzene, 6 parts of 4 ethoxy-4-phenylpiperidine which has been isolated from its hydrochloride, 10.6 parts of sodium carbonate, and a few crystals of potassium iodide in 160 parts of 4-methyl-2-pentanone is stirred and refluxed for 36 hours. The cooled reaction mixture is filtered and the solvent is evaporated from the filtrate. The residue is dissolved in diisopropyl ether and hydrogen chloride gas is introduced into the solution. The hydrochloride which precipitates is filtered off and recrystallized from acetone to give 1-(γ-phenylpropyl)-4-ethoxy-4-phenylpiperidine hydrochloride melting at about 181–182.5° C.

Example 15

A mixture of 5.5 parts of 4-chloro-1-phenyl-1-butene, 5 parts of 4-methoxy-4-phenylpiperidine liberated from its hydrochloride by the procedure of Example 8, 9 parts of sodium carbonate, and a few crystals of potassium iodide in 160 parts of 4-methyl-2-pentanone is stirred and refluxed for 2 days. The cooled reaction mixture is filtered and the solvent is evaporated. A solution of the residue in diisopropyl ether is prepared and hydrogen chloride gas is introduced into it. The precipitated hydrochloride is filtered off and recrystallized from 2-propanol to give 1-phenyl-4-(4-methoxy - 4 - phenylpiperidino)-1-butene hydrochloride melting at about 237.8–238.6° C. The free base of this compound has the formula

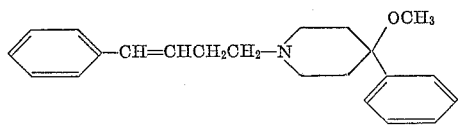

Example 16

A solution of 5 parts of 1-phenyl-4-(4-methoxy-4-phenylpiperidino)-1-butene hydrochloride in 78 parts of 2-propanol and 45 parts of distilled water is hydrogenated under atmospheric pressure in the presence of 1.4 parts of a 10% palladium-on-charcoal catalyst. After the calculated amount of hydrogen is taken up, hydrogenation is stopped. The catalyst is filtered off and washed with methanol and the solvent is evaporated from the combined filtrates. A solution of the residue in 400 parts of water is alkalized and extracted with ether. The ether solution is dried over potassium carbonate and hydrogen chloride gas is passed through the solution to give 1-(δ-phenylbutyl)-4-methoxy-4-phenylpiperidine hydrochloride melting at about 213–217° C.

Example 17

To a stirred mixture of 4.5 parts of 4-methoxy-4-phenylpiperidine (isolated from its oxalate), 8.3 parts of sodium carbonate, a few crystals of potassium iodide, and 80 parts of 4-methyl-2-pentanone is added portionwise a solution of 5.2 parts of cinnamyl chloride in 24 parts of 4-methyl-2-pentanone. The reaction mixture is refluxed for 20 hours. The cooled reaction mixture is filtered to remove inorganic salts and the solvent is evaporated from the filtrate. The residue is recrystallized first from ether and then from petroleum ether to give 1-cinnamyl-4-methoxy-4-phenylpiperidine melting at about 85.8–87° C.

To prepare the hydrochloride of this compound dry hydrogen chloride gas is passed through and a diisopropyl ether solution of the base. The crude hydrochloride is recrystallized from a mixture of acetone and 2-propanol and it melts at 221–222° C. The free base has the formula

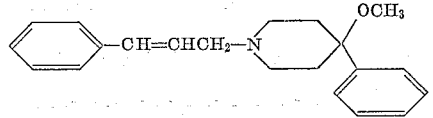

Example 18

A mixture of 3.05 parts of cinnamyl chloride, 3.6 parts of 4-ethoxy-4-phenylpiperidine which has been isolated from its hydrochloride, 5.3 parts of sodium carbonate, and a few crystals of potassium iodide in 280 parts of 4-methyl-2-pentanone is stirred and refluxed for 3 days. The reaction mixture is cooled and filtered and the solvent is evaporated from the filtrate. The residue is dissolved in 2-propanol and mixed with a solution of 1.2 parts of oxalic acid dihydrate in 80 parts of 2-propanol. On standing 4 hours at room temperature 1-cinnamyl-4-ethoxy-4-phenylpiperidine oxalate precipitates. This product melts at about 200–202° C.

Example 19

An aqueous solution of 6.39 parts of 4-propoxy-4-phenylpiperidine is alkalized and extracted with benzene-ether. After evaporation of the solvent from this solution, the residue is dissolved in 120 parts of 4-methyl-2-pentanone together with 5.3 parts of cinnamyl chloride, 8 parts of sodium carbonate and a few crystals of potassium iodide. The mixture is refluxed for 40 hours and filtered hot. The solvent is evaporated from the filtrate and the oily residue is dissolved in 320 parts of diisopropyl ether. Introduction of hydrogen chloride gas into the solution precipitates the 1-cinnamyl-4-propoxy-4-phenylpiperidine hydrochloride. After recrystallization from acetone this product melts at about 202–205° C.

Example 20

The free base is liberated from 4.6 parts of 4-butoxy-4-phenylpiperidine hydrochloride by evaporation of solvent from the benzene-ether extract of an alkalized aqueous solution of the salt. The resultant residue is dissolved in 120 parts of 4-methyl-2-pentanone together with 3.63 parts of cinnamyl chloride, 5.4 parts of sodium carbonate and a few crystals of potassium iodide. The mixture is stirred and refluxed for 40 hours and filtered hot. The solvent is evaporated from the filtrate and the oily residue is dissolved in 320 parts of dry diisopropyl ether. Hydrogen chloride gas in introduced into the filtrate and the precipitated hydrochloride is recrystallized from a mixture of acetone and methanol. This gives 1-cinnamyl-4-butoxy-4-phenylpiperidine hydrochloride melting at about 218–219.2° C.

*Example 21*

A mixture of 3 parts of 4-methoxyacetophenone, 3.8 parts of 4-methoxy-4-phenylpiperidine hydrochloride, 0.1 part of hydrochloric acid and 32 parts of 2-propanol is refluxed for 1 hour. To the cooled reaction mixture is added 0.6 part of paraformaldehyde and the mixture is further refluxed for 3 hours. The precipitate is filtered from the cooled reaction mixture and treated with acetone. The acetone solution is cooled for 4 hours at 0° C. to give 1-[β-(4-methoxybenzoyl)ethyl]-4-methoxy-4-phenyl-piperidine hydrochloride melting at about 192–195° C.

To a solution of a 4 parts of 1-[β-(4-methoxybenzoyl)-ethyl]-4-methoxy-4-phenylpiperidine in 80 parts of ethanol is added portionwise 0.5 part of sodium borohydride. When the addition is complete the mixture is heated for 30 minutes at about 50° C. and it is stirred for 12 hours at room temperature. The resultant mixture is decomposed with 5 N hydrochloric acid and the solvent is evaporated. The residue is dissolved in water and alkalized and the resultant mixture is extracted with chloroform. The chloroform solution is evaporated and the residue is dissolved in a mixture of diisopropyl ether and 2-propanol and hydrogen chloride gas is introduced into it. The crude product which precipitates is recrystallized from 2-propanol to give 1-(4-methoxycinnamyl)-4-methoxy-4-phenylpiperidine hydrochloride melting at about 230–231° C.

If m-fluoroacetophenone is substituted for p-methoxyacetophenone in the above procedure, the product is 1-(3-fluorocinnamyl)-4-methoxy-4-phenylpiperidine hydrochloride.

*Example 22*

A mixture of 3.82 parts of 1-phenyl-4-chloro-1-butene, 3.6 parts of 4-ethoxy-4-phenylpiperidine (isolated from its hydrochloride), 5.3 parts of sodium carbonate and a few crystals of potassium iodide in 280 parts of 4-methyl-2-pentanone is stirred and refluxed for 72 hours. The cooled reaction mixture is filtered and the solvent is evaporated from the filtrate under reduced pressure. The oily residue is dissolved in diisopropyl ether and hydrogen chloride gas is introduced into the solution. The precipitated hydrochloride is filtered off and recrystallized from 2-propanol to give 1-phenyl-4-(4-ethoxy-4-phenyl-piperidino)-1-butene hydrochloride melting at about 190–192° C.

What is claimed is:
1. A compound of the formula

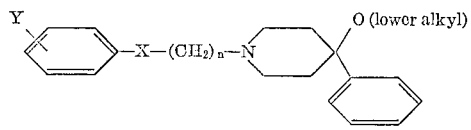

wherein Y is selected from the group consisting of hydrogen, methyl, methoxy, and fluorine; X is selected from the group consisting of —CH$_2$— and —CH=CH—; and $n$ is a positive integer less than 4.

2. A compound of the formula

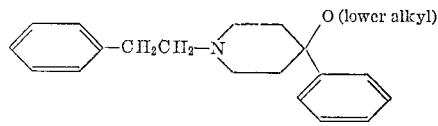

3. 1-(β-phenylethyl)-4-ethoxy-4-phenylpiperidine.
4. A compound of the formula

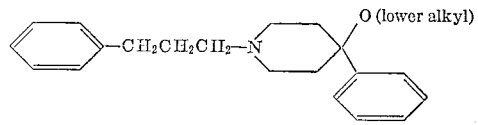

5. 1-(γ-phenylpropyl)-4-ethoxy-4-phenylpiperidine.
6. A compound of the formula

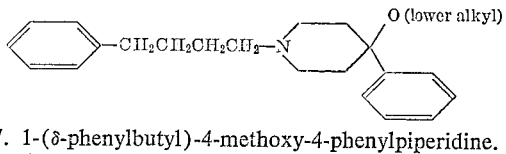

7. 1-(δ-phenylbutyl)-4-methoxy-4-phenylpiperidine.
8. A compound of the formula

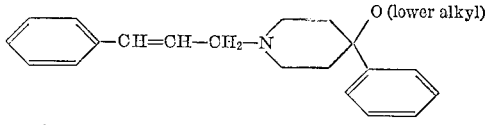

9. 1-cinnamyl-4-ethoxy-4-phenylpiperidine.
10. A compound of the formula

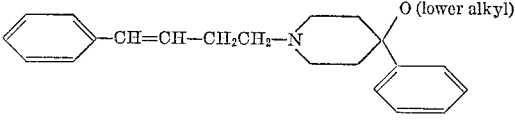

11. 1 - phenyl-4-(4-methoxy-4-phenylpiperidino)-1-butene.

References Cited in the file of this patent
UNITED STATES PATENTS

| | | |
|---|---|---|
| 2,498,435 | Lee et al. | Feb. 21, 1950 |
| 2,775,590 | Schmidle et al. | Dec. 25, 1956 |
| 2,880,211 | Elpern | Mar. 31, 1959 |

FOREIGN PATENTS

| | | |
|---|---|---|
| 872,045 | Germany | Mar. 30, 1953 |